(12) United States Patent
Takeda et al.

(10) Patent No.: US 10,841,882 B2
(45) Date of Patent: *Nov. 17, 2020

(54) RADIO COMMUNICATION BASE STATION APPARATUS AND METHOD FOR CONTROLLING TRANSMISSION POWER OF SOUNDING REFERENCE SIGNAL

(71) Applicant: Sun Patent Trust, New York, NY (US)

(72) Inventors: Kazuki Takeda, Kanagawa (JP); Akihiko Nishio, Osaka (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/678,260

(22) Filed: Nov. 8, 2019

(65) Prior Publication Data

US 2020/0092823 A1 Mar. 19, 2020

Related U.S. Application Data

(63) Continuation of application No. 16/267,980, filed on Feb. 5, 2019, now Pat. No. 10,517,046, which is a (Continued)

(30) Foreign Application Priority Data

Aug. 1, 2012 (JP) .................. 2012-171086

(51) Int. Cl.
*H04W 4/00* (2018.01)
*H04W 52/14* (2009.01)
(Continued)

(52) U.S. Cl.
CPC .......... *H04W 52/146* (2013.01); *H04B 7/024* (2013.01); *H04J 11/00* (2013.01);
(Continued)

(58) Field of Classification Search
CPC . H04W 52/146; H04W 52/04; H04W 52/143; H04W 52/325; H04W 16/32;
(Continued)

(56) References Cited

U.S. PATENT DOCUMENTS 9,313,751 B2 4/2016 Englund et al.
9,419,766 B2 8/2016 Takeda et al.
(Continued)

FOREIGN PATENT DOCUMENTS

JP 2011-509592 A 3/2011
WO 2011/100466 A2 8/2011
WO 2011/152685 A2 12/2011

OTHER PUBLICATIONS

3GPP TS 36.211 V10.4.0, "3rd Generation Partnership Project; Technical Specification Group Radio Access Network; Evolved Universal Terrestrial Radio Access (E-UTRA); Physical Channels and Modulation (Release 10)," Dec. 2011, 101 pages.
(Continued)

*Primary Examiner* — Maharishi V Khirodhar
(74) *Attorney, Agent, or Firm* — Seed IP Law Group LLP

(57) ABSTRACT

A radio terminal is provided that can provide a flexible transmission power control for an SRS without restrictions due to the transmission power control of a PUSCH, for the purpose of enabling use of an SRS for various purposes in a HetNet CoMP environment. The radio terminal receives a control signal including a transmission power control command (TPC command) to be applied to an aperiodic sounding reference signal (A-SRS), through a physical downlink control channel (PDCCH), updates a transmission power value of the A-SRS using the TPC command, and transmits the A-SRS using the updated transmission power value in accordance with a transmission request included in a control signal indicating assignment of a physical downlink data (Continued)

channel (PDSCH) or assignment of a physical uplink data channel (PUSCH).

12 Claims, 7 Drawing Sheets

Related U.S. Application Data continuation of application No. 15/900,591, filed on Feb. 20, 2018, now Pat. No. 10,285,137, which is a continuation of application No. 15/590,899, filed on May 9, 2017, now Pat. No. 9,936,460, which is a continuation of application No. 15/206,071, filed on Jul. 8, 2016, now Pat. No. 9,681,390, which is a continuation of application No. 14/342,239, filed as application No. PCT/JP2013/003647 on Jun. 11, 2013, now Pat. No. 9,419,766.

(51) Int. Cl.

| | | |
|---|---|---|
| *H04W 16/32* | (2009.01) | |
| *H04W 52/08* | (2009.01) | |
| *H04W 52/32* | (2009.01) | |
| *H04W 52/54* | (2009.01) | |
| *H04L 5/00* | (2006.01) | |
| *H04J 11/00* | (2006.01) | |
| *H04W 52/04* | (2009.01) | |
| *H04B 7/024* | (2017.01) | |
| *H04W 72/04* | (2009.01) | |
| *H04W 88/02* | (2009.01) | |
| *H04W 88/12* | (2009.01) | |

(52) U.S. Cl.
CPC ............ *H04L 5/005* (2013.01); *H04L 5/0048* (2013.01); *H04L 5/0053* (2013.01); *H04W 16/32* (2013.01); *H04W 52/04* (2013.01); *H04W 52/08* (2013.01); *H04W 52/143* (2013.01); *H04W 52/32* (2013.01); *H04W 52/325* (2013.01); *H04W 52/54* (2013.01); *H04W 72/042* (2013.01); *H04W 88/02* (2013.01); *H04W 88/12* (2013.01)

(58) Field of Classification Search
CPC ..... H04W 52/08; H04W 52/32; H04W 52/54; H04W 88/02; H04W 88/12; H04W 52/46; H04W 52/16; H04B 7/024; H04L 5/0048; H04L 5/0053; H04L 5/005; H04J 11/00
See application file for complete search history.

(56) References Cited

U.S. PATENT DOCUMENTS

| | | | |
|---|---|---|---|
| 9,681,390 B2 | 6/2017 | Takeda et al. | |
| 9,936,460 B2 | 4/2018 | Takeda et al. | |
| 10,517,046 B2* | 12/2019 | Takeda ................ | H04W 52/325 |
| 2011/0098054 A1 | 4/2011 | Gorokhov et al. | |
| 2013/0078913 A1 | 3/2013 | Lee et al. | |
| 2013/0343313 A1 | 12/2013 | Takeda et al. | |
| 2014/0029586 A1 | 1/2014 | Loehr et al. | |
| 2014/0153536 A1 | 6/2014 | Ouchi et al. | |
| 2014/0241301 A1 | 8/2014 | Nakashima et al. | |

OTHER PUBLICATIONS

3GPP TS 36.212 V10.4.0, "3rd Generation Partnership Project Technical Specification Group Radio Access Network; Evolved Universal Terrestrial Radio Access (E-UTRA); Multiplexing and channel coding (Release 10)," Dec. 2011, 79 pages.
3GPP TS 36.213 V10.4.0, "3rd Generation Partnership Project; Technical Specification Group Radio Access Network; Evolved Universal Terrestrial Radio Access (E-UTRA); Physical layer procedures (Release 10)," Dec. 2011, 125 pages.
3GPP TR 36.819 V11.1.0, "3rd Generation Partnership Project; Technical Specification Group Radio Access Network; Coordinated multi-point operation for LTE physical layer aspects (Release 11)," Dec. 2011, 69 pages.
ETSI ITS 136 213 V8.5.0, LTE; Evolved Universal Terrestrial Radio Access (E-UTRA); Physical layer procedures (3GPP TS 36.213 V8.5.0 Release 8), Feb. 2009, 76 pages.
Extended European Search Report dated Apr. 20, 2015, for corresponding EP Application No. 13825002.2-1855 / 2739080, 7 pages.
Huawei, HiSilicon, "TPC enhancements for SRS power control for CoMP," R1-122525, Agenda Item: 7.5.6.2, 3GPP TSG RAN WG1 Meeting #69, Prague, Czech Republic, May 21-25, 2012, 4 pages.
International Search Report, dated Jul. 23, 2013, for corresponding International application No. PCT/JP2013/003647, 3 pages. (W/ English Translation).
New Postcom, "Remaining issues on SRS power control in CoMP scenario," R1-122090, Agenda Item: 7.5.6.2, 3GPP TSG RAN WG1 Meeting #69, Prague, Czech Republic, May 21-25, 2012, 4 pages.
Pantech, "Remaining details on aperiodic SRS," R1-110754, Agenda Item: 6.2.4, 3GPP TSG RAN1 #64, Taipei, Taiwan, Feb. 21-25, 2011, 3 pages.
Pantech, "Enhancement on SRS power control," R1-122453, Agenda item: 7.5.6.2, 3GPP TSG RAN WG1 Meeting #69, Prague, Czech Republic, May 21-25, 2012, 4 pages.
Panasonic, "SRS power control enhancement for Rel. 11," R1-122196, Agenda Item: 7.5.6.2 SRS power control, 3GPP TSG-RAN WG1 Meeting #69, Prague, Czech Republic, May 21-25, 2012, 4 pages.

* cited by examiner

RADIO COMMUNICATION BASE STATION APPARATUS AND METHOD FOR CONTROLLING TRANSMISSION POWER OF SOUNDING REFERENCE SIGNAL

BACKGROUND

Technical Field

The present disclosure relates to a radio communication terminal apparatus, a radio communication base station apparatus, and a radio communication method.

Description of the Related Art

In LTE (Long Term Evolution) and an evolved version thereof, i.e., LTE-A (LTE-Advanced) formulated in 3GPP (3rd Generation Partnership Project), uplink is provided employing SC-FDMA (Single-Carrier Frequency-Division Multiple Access) with a small PAPR (Peak-to-Average Power Ratio) and high power usage efficiency in a terminal (for example, see Non-Patent Literature (hereinafter, abbreviated as NPLs) 1 to 4). In uplink of LTE and LTE-A, scheduling for allocating time and frequency resources according to the propagation path environment of the terminal, and adaptive control for controlling a coding rate or a modulation scheme are performed. In order to appropriately perform frequency scheduling and adaptive control to enable high throughput, it is indispensable for a base station side to know the propagation path situation of the terminal.

In order to measure the uplink propagation path situation of the terminal, an SRS (Sounding Reference Signal) is used in uplink of LTE (NPL 1). An SRS is a reference signal transmitted with the last SC-FDMA symbol of an uplink subframe (PUSCH: Physical Uplink Shared Channel) including a plurality of SC-FDMA symbols. A base station can know the uplink situation according to CSI (Channel State Information) calculated using the SRS or the reception quality of the SRS.

LTE employs a P-SRS (Periodic-SRS) transmitted periodically at time indicated by an instruction from a higher layer, such as RRC (Radio Resource Control) information. The base station beforehand instructs the terminal on the transmission subframe for an SRS, the period thereof, the power offset for the SRS to be transmitted, the frequency bandwidth, the frequency position, and an orthogonal resource, such as Comb or CS (Cyclic Shift) for orthogonalization to an SRS of another terminal. The terminal transmits an SRS with the last SC-FDMA symbol in the instructed subframe. In this way, regardless of the presence or absence of transmission of data and a control signal in uplink, the base station can periodically measure CSI of the terminal.

Meanwhile, uplink packet communication generally has high burstiness. It is preferable for a base station to be able to measure CSI on a necessary band when needed. Moreover, even when performing no data communication in uplink or downlink, a terminal periodically transmits an SRS and therefore consumes extra power. For this reason, LTE-A employs an A-SRS (Aperiodic-SRS) to be transmitted on the basis of a transmission request included in DCI (Downlink Control Information) which is a control signal indicating data assignment in uplink and downlink. An A-SRS is transmitted only upon request. This can reduce unnecessary power consumption in the terminal, also reduce interference to and from another cell and improve the efficiency of SRS resources.

Note that, there has been a discussion on the introduction of a heterogeneous network (HetNet) in which a plurality of base stations (hereinafter referred to as nodes) providing different coverage areas are deployed in a cell in LTE Release 11 (hereinafter referred to as Rel. 11), which is a further evolved version of LTE-A. A HetNet enable, for example, reception in a receiving node with a small path loss and offload for traffic, and therefore enables high throughput. Moreover, a terminal can decrease transmission power for a receiving node with a small path loss and can therefore reduce power consumption. For these reasons, in comparison with a non-HetNet involving only a macro node, a HetNet can improve a transmission speed while reducing necessary transmission power for a terminal.

Moreover, CoMP (Coordinated Multi-Point) in which these nodes transmit and receive a signal in cooperation has also been discussed in Rel. 11 HetNet (NPL 4). FIG. 1 illustrates an example of a HetNet CoMP system. HetNet CoMP includes one or more macro base stations (macro nodes), one or more pico base stations (pico nodes), and one or more terminals. CoMP can enhance an SINR (Signal-to-Interference plus Noise Power Ratio), for example, by a plurality of nodes receiving and combining signals transmitted by a terminal that is located at a cell edge and is strongly influenced by interference. Moreover, nodes can transmit and receive in a coordinated manner. Therefore, optimal nodes can be used independently in uplink and downlink. For example, a PDSCH is preferably transmitted by a node maximizing the reception power in a terminal, and a PUSCH is preferably received by a node minimizing a path loss. Introduction of CoMP enables communication with different nodes in uplink and downlink. This prevents large differences in the throughput and quality between uplink and downlink.

In order to acquire the effect of HetNet CoMP, it is important to appropriately select transmitting/receiving nodes participating in communication from among nodes distributed geographically, and to appropriately switch between nodes according to a peripheral situation or the situation of the terminal. Transmitting/receiving nodes may be selected and switched using a reference signal (for example, CRS, CSI-RS, or SRS) transmitted in uplink and downlink. In this case of using a CRS or a CSI-RS transmitted in downlink, a terminal measures CSI to each node and feeds back the CSI using uplink. Then, the base station side determines a transmitting/receiving node on the basis of the fed-back CSI. On the other hand, in the case of using an SRS transmitted in uplink, the base station side can directly measure CSI with an SRS transmitted by the terminal. Therefore, the system using an SRS can decrease the amount of information fed-back from the terminal to the base station in comparison with a system using a CRS or a CSI-RS. Moreover, the time required from measurement of the terminal to the completion of the feedback is omissible, so that a feedback delay can be reduced.

It is known that the reversibility of a channel is satisfied in TDD (Time-division duplex), and that downlink precoding, the scheduling of a PDSCH, or adaptive control is possible on the basis of the CSI measurement result acquired using an SRS. HetNet CoMP involves a high probability of enabling communication with a node having a small path loss since a plurality of nodes are distributed in the cell. Therefore, it can be said that there is a high possibility of also using downlink adaptive control using an SRS.

As described above, in and after Rel. 11 into which HetNet and CoMP are introduced, an SRS may be used for various purposes such as not only uplink scheduling and adaptive control used in the related art, but also selection of a transmitting/receiving node and downlink adaptive control.

CITATION LIST

Non-Patent Literature

NPL 1
3GPP TS 36.211 V10.4.0, "Physical Channels and Modulation (Release 10)," December 2011
NPL 2
3GPP TS 36.212 V10.4.0, "Multiplexing and channel coding (Release 10)," December 2011
NPL 3
3GPP TS 36.213 V10.4.0, "Physical layer procedures (Release 10)," December 2011
NPL 4
3GPP TR 36.819 v11.1.0, "Coordinated multi-point operation for LTE physical layer aspects," December 2011

BRIEF SUMMARY

Technical Problem

One or more receiving nodes for an uplink data signal are likely to be one or more receiving nodes nearest to the terminal. This is to reduce interference with another cell or the power consumption in the terminal. On the other hand, in consideration of using an SRS for selection of a transmitting/receiving node or downlink adaptive control, an SRS is required to be receivable at nodes in a larger range. That is, in HetNet, an uplink data signal and an SRS are required to be receivable in different nodes.

The transmission power of an SRS is given by Equation 1. In this equation, $P_{CMAX,c}(i)$, $P_{O\_PUSCH,c}(j)$, $\alpha_c(j) \cdot PL_c$, and $f_c(i)$ are provided by diverting terms included in the transmission power equation of a PUSCH. The term of $10 \log_{10}(M_{SRS,c})$ is a term for proportioning the transmission power of an SRS to the transmission band width, i.e., for keeping the constancy of the transmission power density. This equation is different from a PUSCH only in parameter $P_{SRS\_OFFSET,c}(m)$ indicated from a higher layer. $P_{SRS\_OFFSET,c}(m)$ represents a transmission power offset given to an SRS for uplink data (PUSCH). $P_{SRS\_OFFSET,c}(m)$ can be set as independent two values according to the type of SRS (A-SRS or P-SRS). That is, different transmission power offsets can be given to an A-SRS and a P-SRS. From the above, it is found that an SRS can be set into different power from that of a PUSCH using a parameter from a higher layer. This can be used to thereby set an A-SRS or a P-SRS into large transmission power suitable for reception in more receiving nodes than object nodes receiving a PUSCH. FIG. 2 illustrates an example for providing different coverage between a PUSCH and an SRS using power offset $P_{SRS\_OFFSET,c}(m)$.

$$P_{SRS,c}(i) = \min \left\{ \begin{array}{l} P_{CMAX,c}(i), P_{SRS\_OFFSET,c}(m) + 10\log_{10}(M_{SRS,c}) + \\ P_{O\_PUSCH,c}(j) + \alpha_c(j) \cdot PL_c + f_c(i) \end{array} \right\} \quad \text{(Equation 1)}$$

However, a power offset indicated from a higher layer does not enable a frequent high-speed transmission power control. In particular, there is a problem in that this control cannot follow the fading fluctuation caused by movement of a terminal or a variation in a surrounding environmental. In LTE, a TPC command included in a control signal (DCI) for instructing data allocation is used as a system of performing high-speed control on transmission power of an uplink control signal (PUCCH: Physical Uplink Control Channel) or a PUSCH. TPC commands are accumulated every time being received and are used for calculation of transmission power. Thereby, the base station indicates transmission power control using a TPC command according to the situation of a terminal and can more precisely change transmission power faster than higher layer signaling. Hereinafter, power control through a TPC command is referred to as closed loop TPC.

In the conventional method, a closed loop TPC for PUSCH and a closed loop TPC for a PUCCH are performed separately. More specifically, in a plurality of DCI formats, a TPC command included in DCI format 0/4 indicating data assignment information on a PUSCH is used for a closed loop TPC for PUSCH, and a TPC command included in DCI formats 1/1A/1B/1D/2/2A/2B/2C indicating data assignment information on a PDSCH is used for closed loop TPC for PUCCH. Hereinafter, a TPC command accumulation value for a PUSCH is represented with NO, and a TPC command accumulation value for PUCCH is represented with g(i).

As can be seen from Equation 1, the transmission power of an SRS is controlled using a closed loop TPC. However, this is provided by diverting TPC command accumulation value NO of a PUSCH. In other words, this represents that a node receiving an SRS is assumed to be the same as a node receiving the data of a PUSCH. In conventional systems, the node receiving a PUSCH is always the same as the node receiving an SRS, an SRS is transmitted in order to measure CSI for scheduling of a PUSCH, and the assumption described above can therefore be applied for operations. However, in Rel. 11 as described above, uplink data (PUSCH) and an SRS may be received by different nodes. In such a case, it is desirable that transmission power control of these signals can be performed separately using independent TPC commands.

FIG. 3 illustrates an example of a terminal receiving a PDSCH or the like from a macro node and transmitting a PUSCH to a pico node. The reception range (coverage) for PUSCH data has a different size from the coverage for an SRS due to transmission power offset. In this situation, if a terminal approaches a PUSCH receiving pico node, a base station issues an instruction for decreasing transmission power using a TPC command. Since the transmission power of the SRS also decreases according to the TPC command, the SRS cannot be received with necessary quality in, for example, the macro node illustrated in FIG. 3. On the contrary, if the terminal moves away from the PUSCH receiving pico node, the base station issues an instruction for increasing transmission power using a TPC command. Since the transmission power of an SRS also increases according to the TPC command, transmission is performed with excessive power. An SRS with such excessive power increases interference with another cell to result in deterioration of CSI measurement accuracy of the SRS.

It is an object of the present disclosure to provide a radio communication terminal apparatus, a radio communication base station apparatus, and a radio communication method that can perform a flexible transmission power control of an SRS without restrictions due to the transmission power control of a PUSCH, in order to enable use of an SRS for various purposes in a HetNet CoMP environment.

Solution to Problem

A radio communication terminal apparatus according to an aspect of the present disclosure includes: a receiving section that receives a control signal including a TPC command to be applied to an A-SRS, through a physical downlink control channel; a control section that updates a transmission power value of the A-SRS using the TPC command; and a transmitting section that transmits the A-SRS using the updated transmission power value in accordance with a transmission request included in a control signal indicating assignment of a physical downlink data channel or assignment of a physical uplink data channel.

A radio communication base station apparatus according to an aspect of the present disclosure includes: a transmitting section that transmits a control signal including a TPC command to be applied to an A-SRS, and a control signal indicating one of assignment of a physical downlink data channel and a physical uplink data channel through a physical downlink control channel; and a control section that determines a value of the TPC command, an A-SRS transmission request, and a transmission/reception participating node based on a result of CSI measurement.

A radio communication method according to an aspect of the present disclosure includes: receiving a control signal including a TPC command to be applied to an A-SRS, through a physical downlink control channel; updating a transmission power value of the A-SRS using the TPC command; and transmitting the A-SRS using the updated transmission power value in accordance with a transmission request included in a control signal indicating assignment of a physical downlink data channel or assignment of a physical uplink data channel.

Advantageous Effects of Disclosure

According to the present disclosure, a terminal can perform a transmission power control on an SRS independently of a PUSCH.

DETAILED DESCRIPTION

Hereinafter, embodiments of the present disclosure will be described in detail with reference to the accompanying drawings. In the embodiments, the same components are designated with the same reference signs, and detailed explanations thereof will be omitted.

Embodiment 1

[Configuration of Network System]

Figure 1:
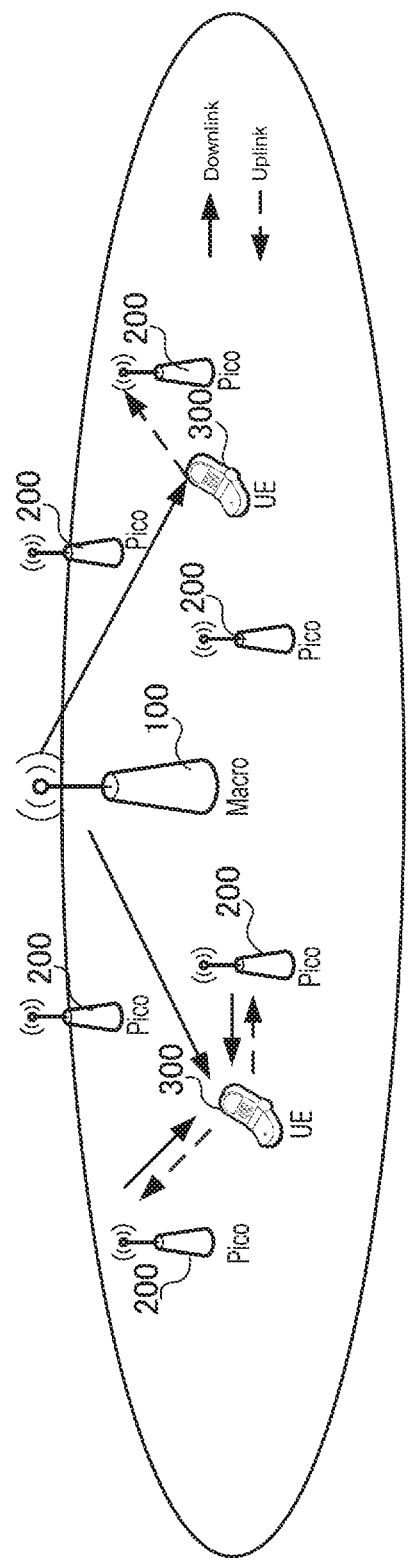
FIG. 1 is a conceptual diagram of a HetNet CoMP cell.
Figure 2:
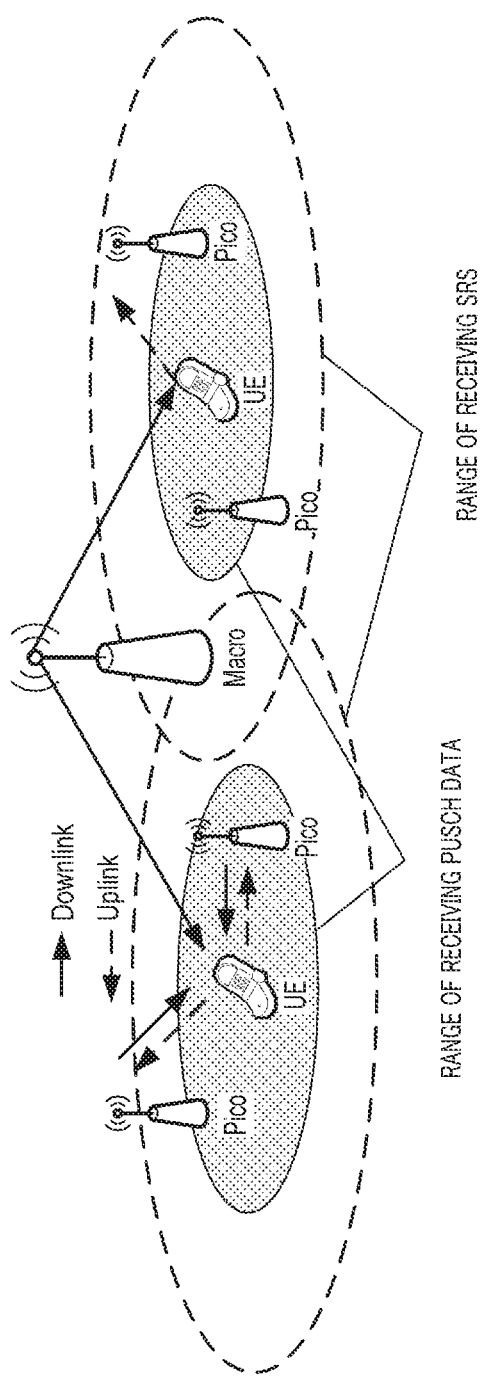
FIG. 2 illustrates the reception ranges (coverage) of uplink data and an SRS.
Figure 3:
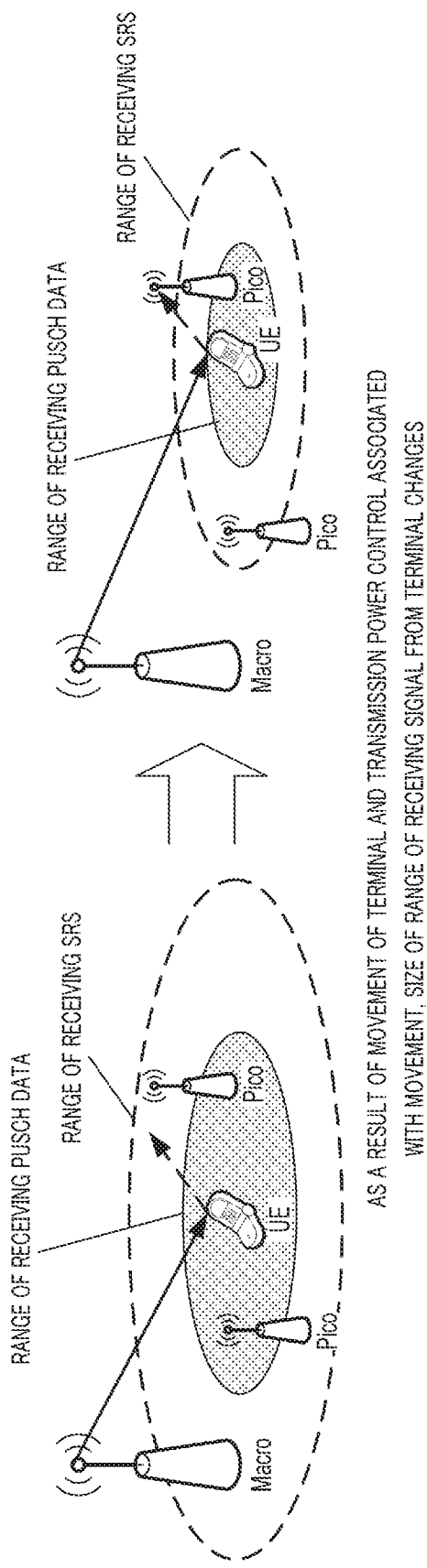
FIG. 3 illustrates an example of performing a conventional closed loop TPC in HetNet CoMP.

A network system according to Embodiment 1 of the present disclosure is a HetNet or HetNet CoMP and includes macro node 100, pico node 200, and terminal (UE) 300, as illustrated in FIG. 1. One macro node 100 and one or more pico nodes 200 are mounted in each macro cell. Pico node 200 may be a pico base station forming its own pico cell or may be a node, such as an RRH (Remote radio head), communicating with a terminal as a part of a distributed transmitting/receiving antenna of a macro cell. Macro node 100 and each pico node 200 are connected with an interface having a low delay and large capacity, such as an optical fiber. Macro node 100 and each pico node 200 in the cell share the transmission parameter of an SRS allocated to each terminal 300 existing in the cell, and receive the SRS to measure CSI. Each terminal 300 communicates by radio with one or more nodes 100 and 200 selected by macro node 100. A downlink transmitting node and an uplink receiving node may be the same as each other, and may be different from each other. A transmitting node and a receiving node are set individually for each terminal 300.

In the present embodiment, in addition to a conventional closed loop TPC for a PUSCH, each terminal 300 performs a closed loop TPC for an A-SRS using DCI format 3/3A which is a kind of control signal transmitted through a PDCCH in a downlink subframe.

DCI format 3/3A is a control signal enabling transmission of one control information obtained by consolidating many TPC commands to one or more terminals 300. The CRC of DCI format 3/3A is scrambled with a certain ID (RNTI), and a base station needs to beforehand indicate the RNTI to a terminal 300 in order to decode the DCI format 3/3A. In order to judge which one of TPC commands is a TPC command addressed to the own terminal among terminals 300 decoding DCI format 3/3A with the same RNTI, a TPC command index is needed in addition to the RNTI.

Therefore, in the present embodiment, it is assumed that the base station beforehand indicates RNTI common to terminals 300 and TPC command indices different between terminals 300, as individual control information for the respective terminals, with an RRC control signal or the like, to terminals 300 performing a closed loop TPC for an A-SRS using DCI format 3/3A. Hereinafter, RNTI used for decoding DCI format 3/3A for an A-SRS is referred to as TPC-SRS-RNTI. Terminal 300 not performing a closed loop TPC with DCI format 3/3A links an A-SRS to a closed loop TPC for a PUSCH similarly to conventional Rel. 10. In other words, the transmission power according to Equation 1 is used. It is assumed that a P-SRS is transmitted using the transmission power according to Equation 1 similarly to conventional Rel. 10.

[Configuration of Macro Node]

Figure 4:
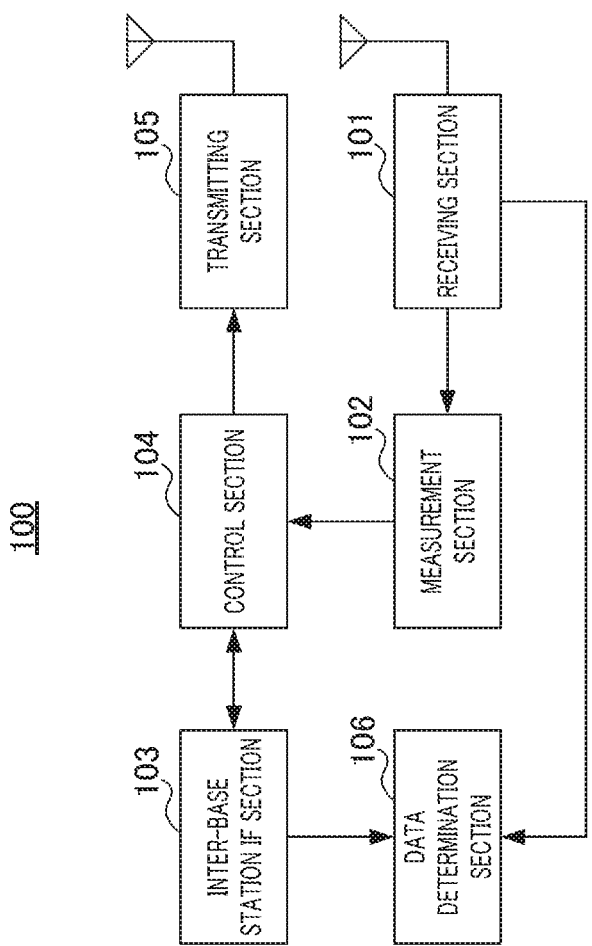
FIG. 4 is a block diagram illustrating a configuration of a main portion of a macro node according to Embodiment 1 of the present disclosure.

FIG. 4 is a block diagram illustrating a configuration of a main portion of macro node 100 according to the present embodiment. Macro node 100 illustrated in FIG. 4 mainly includes receiving section 101, measurement section 102, inter-base station interface (IF) section 103, control section 104, transmitting section 105, and data determination section 106. Control section 104 is not limited to be included in the macro node, and at least one control section 104 only has to be in a HetNet CoMP system connecting macro node 100 and each pico node 200. Alternatively, multiple control sections 104 may exchange information with each other, and any one of the control sections may also be operated as control section 104. Hereinafter, control section 104 is assumed to be implemented as a part of macro node 100.

Receiving section 101 performs radio reception processing (down-conversion, demodulation, decode, and/or the like) on a radio signal transmitted from each terminal 300 and received through the antenna, and extracts an SRS, a PUSCH, a PUCCH, or the like. Receiving section 101 outputs an SRS to measurement section 102. If macro node 100 is a PUSCH receiving node for terminal 300, receiving section 101 outputs a PUSCH to data determination section 106.

Measurement section 102 measures CSI with an SRS and outputs the measurement result to control section 104.

Inter-base station interface section 103 performs wired communication with pico node 200. More specifically, inter-base station interface section 103 receives the CSI measurement result transmitted from pico node 200 and forwards the result to control section 104 in macro node 100. Inter-base station interface section 103 transmits information representing an instruction for participating in transmission/reception to a transmission/reception participating node selected by control section 104. Inter-base station interface section 103 transmits scheduling information on a PDSCH and a PUSCH, and a parameter necessary for transmitting/receiving a PDSCH and a PUSCH to and from terminal 300 to pico node 200. Inter-base station interface section 103 receives uplink data of terminal 300 forwarded from pico node 200 and outputs the data to data determination section 106 of macro node 100.

Control section 104 controls, for example, selection of a transmission/reception participating node, scheduling and parameter setting of a PDSCH and a PUSCH, transmission power of a PUSCH and a PUCCH, and transmission power of an A-SRS. More specifically, control section 104 selects a transmission/reception participating node for each terminal 300 using CSI measured from an SRS received in macro node 100 and pico node 200. Control section 104 determines scheduling of a PDSCH and a PUSCH using the above CSI measurement result. Simultaneously, control section 104 determines PDSCH and PUSCH transmission/reception parameters for each terminal 300.

Control section 104 determines the TPC command of a closed loop TPC indicated to each terminal 300. More specifically, control section 104 collects the reception quality of a PUSCH or the reception quality of an SRS received in each node through inter-base station interface section 103 and determines the value of a TPC command indicated at the time of next assignment of a PUSCH, a PUCCH and an A-SRS. Then, control section 104 generates a 2-bit TPC command for indicating a transmission power control of a PUSCH and includes the command in DCI format 0/4 for indicating uplink data assignment. Control section 104 generates a 1 or 2-bit TPC command for indicating a transmission power control of an A-SRS and includes the command in DCI format 3/3A. Control section 104 generates a 2-bit TPC command for indicating a transmission power control of a PUCCH and includes the command in DCI format 1/1A/1B/1D/2/2A/2B/2C for indicating downlink data assignment. Control section 104 generates a 1 or 2-bit transmission request command for indicating a transmission request for an A-SRS and includes the command in DCI format 0/4 or DCI format 1A/2B/2C. Control section 104 forwards these DCIs to transmitting node 200 participating in transmission to terminal 300. Control section 104 outputs these DCIs to transmitting section 105 when macro node 100 itself is a transmission participating node.

Transmitting section 105 generates a PDCCH, a PDSCH, or the like using various DCIs received from control section 104 and data to each terminal 300 and creates a downlink subframe. Then, transmitting section 105 performs a transmission radio process (up-conversion or the like) on the downlink subframe and transmits the downlink subframe to each terminal 300 through the antenna.

Data determination section 106 performs channel equalization, data demodulation, data decode, and error determination using a PUSCH inputted from receiving section 101 and a PUSCH forwarded from a reception participating node through inter-base station interface section 103. Error determination is performed using a CRC (Cyclic Redundancy Check) code or the like. If there is no error, data determination section 106 performs next data assignment for terminal 300. On the other hand, if an error is detected, data determination section 106 performs a retransmission control of the data for terminal 300.

[Configuration of Pico Node]

Figure 5:
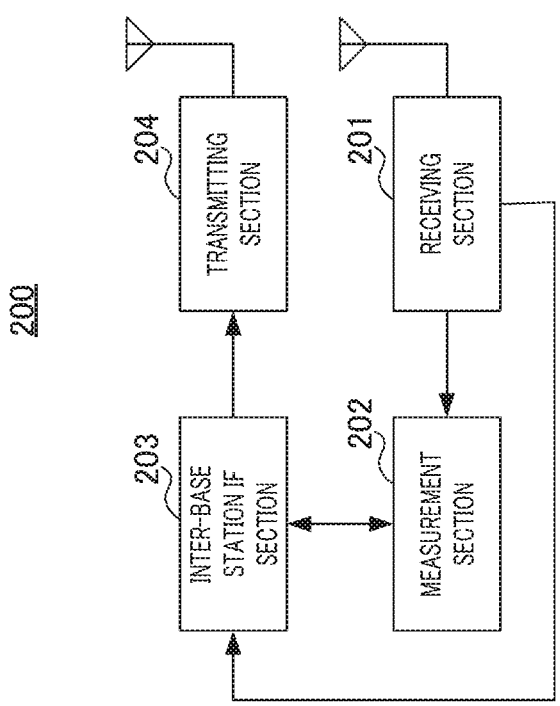
FIG. 5 is a block diagram illustrating a configuration of a main portion of a pico node according to Embodiment 1 of the present disclosure.

FIG. 5 is a block diagram illustrating a configuration of a main portion of pico node 200 according to the present embodiment. Pico node 200 illustrated in FIG. 5 mainly includes receiving section 201, measurement section 202, inter-base station interface section 203, and transmitting section 204.

Receiving section 201 performs radio reception processing (down-conversion and/or the like) on a radio signal transmitted from each terminal 300 and received through the antenna and extracts an SRS, a PUSCH, a PUCCH, or the like. Receiving section 201 outputs an SRS to measurement section 202. Receiving section 201 outputs the extracted PUCCH and PUSCH to inter-base station interface section 203.

Measurement section 202 measures CSI with an SRS and outputs the measurement result to inter-base station interface section 203. This measurement result is forwarded to control section 104 in macro node 100.

Inter-base station interface section 203 performs wired communication with macro node 100. More specifically, inter-base station interface section 203 forwards the CSI measurement result inputted from measurement section 202 to macro node 100. Inter-base station interface section 203 receives indication information on whether corresponding pico node 200 is a transmission/reception participating node for terminal 300, from macro node 100. Inter-base station interface section 203 receives scheduling information on a PDSCH and a PUSCH and parameters necessary for transmitting/receiving of a PDSCH and a PUSCH, from macro node 100. Inter-base station interface section 203 outputs a PUSCH and a PUCCH for terminal 300 received from receiving section 201 to data determination section 106 in macro node 100. When pico node 200 is a transmitting node, inter-base station interface section 203 receives DCI generated in macro node 100 and outputs the DCI to transmitting section 204.

Transmitting section 204 generates a PDCCH, a PDSCH, and/or the like using various DCIs received from inter-base station interface section 203 and data to each terminal 300 and creates a downlink subframe. Then, transmitting section 204 performs radio transmission processing (up-conversion and/or the like) on the downlink subframe and transmits the downlink subframe to each terminal 300 through the antenna.

[Configuration of Terminal]

Figure 6:
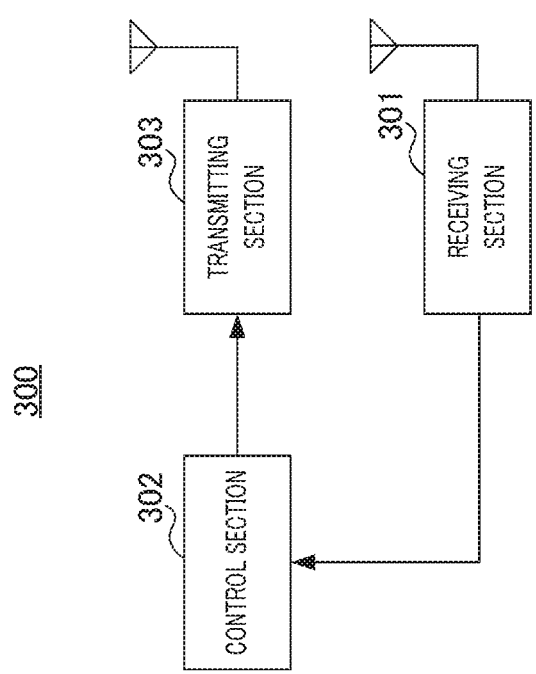
FIG. 6 is a block diagram illustrating a configuration of a main portion of a terminal according to Embodiment 1 of the present disclosure.

FIG. 6 is a block diagram illustrating a configuration of a main portion of terminal 300 according to the present embodiment. Terminal 300 illustrated in FIG. 6 mainly includes receiving section 301, control section 302, and transmitting section 303.

Receiving section 301 performs radio reception processing (down-conversion and/or the like) on a radio signal received through the antenna and extracts a PDCCH, a PDSCH, and/or the like. Then, receiving section 301 extracts assignment information on a PDSCH and a PUSCH, an A-SRS transmission request, a TPC command for performing a closed loop TPC for PUSCH, a TPC command for performing a closed loop TPC for PUCCH, a TPC command for performing a closed loop TPC for A-SRS, or the like, from the PDCCH. Then, receiving section 301 outputs the above information to control section 302.

Control section 302 performs a closed loop TPC using the TPC command received from receiving section 301. Terminal 300 receiving the indication of TPC-SRS-RNTI and a TPC command index holds TPC command accumulation values corresponding to a PUSCH, a PUCCH, and an A-SRS and adds newly received TPC commands to respective TPC command accumulation values to update the values. When a transmission request of an A-SRS is made, control section 302 instructs transmitting section 303 to transmit an A-SRS at the next timing for enabling transmission of an A-SRS. A TPC command with DCI format 3/3A is applied to only an A-SRS, and a P-SRS is transmitted with the same transmission power, timing, and cycle as a conventional P-SRS.

Transmitting section 303 performs radio transmission processing (up-conversion and/or the like) on a PUSCH, a PUCCH, an SRS, and/or the like and transmits the resultants through the antenna. Transmitting section 303 performs radio transmission radio processing on a PUSCH, a PUCCH, an SRS and/or the like according to transmission parameters indicated from control section 302.

[Operation Flow]

Next, a main processing procedure for each apparatus according to the present embodiment will be explained below with reference to Step (1) to Step (4).

Step (1): Macro node 100 beforehand indicates the respective parameter sets for a P-SRS and an A-SRS as higher layer control information to each terminal 300. The parameter sets include parameters common to terminals 300 in the cell and parameters assigned individually to terminals 300 in the cell. These parameter sets are parameter sets necessary for generating a P-SRS and an A-SRS and include parameters necessary for identifying a base sequence, a frequency resource, a time resource, an orthogonal resource, and/or the like. Herein, the term "frequency resource" refers to a bandwidth, a frequency position, the presence or absence of frequency hopping, or the like; the term "time resource" refers to the transmission cycle and subframe number of a P-SRS, a transmittable subframe number of an A-SRS, and/or the like; and the term "orthogonal resource" refers to a Comb number, a CS (Cyclic Shift) number, and/or the like assigned so as to differ between terminals 300. These parameter sets include SRS transmission power offset value $P_{SRS\_OFFSET,c}(m)$ included in Equation 1. Here, $P_{SRS\_OFFSET,c}(m)$ takes two values which are a value applied to a P-SRS and a value applied to an A-SRS. These parameter sets include TPC-SRS-RNTI and a TPC command index. These are transmitted from a transmitting node for terminal 300.

Some parameters for an A-SRS can independently be set according to the classification of DCI including a transmission request and the value of a transmission request bit. More specifically, five sets of a bandwidth, a frequency position, a Comb number, a CS number, or the like can be prepared to select which one of sets involves transmission of an A-SRS in according to five formats that are DCI format 0 (transmission request bit is "1"), DCI format 1A/2B/2C (transmission request bit is "1") and DCI format 4 (transmission request bit is "01"), (transmission request bit is "10"), and (transmission request bit is "11").

Step (2): macro node 100 further indicates whether a closed loop TPC for an A-SRS is performed using DCI format 3/3A as higher layer control information to each terminal 300. This may be judged according to whether TPC-SRS-RNTI is indicated and may separately be indicated as control information. This may be performed using DCI format 3/3A in the case of the indication being present, and a closed loop TPC may be performed using a TPC command of DCI format 0/4 in the case of no indication, similarly to conventional schemes.

Step (3): next, terminal 300 sets a P-SRS transmission resource according to the parameter set for a P-SRS indicated from the base station. Then, terminal 300 periodically transmit a P-SRS. Terminal 300 receives DCI format 0/1A/2B/2C/4 transmitted from a transmitting node for the base station and confirms whether transmission of an A-SRS is requested. When the transmission is requested, terminal 300 transmits an A-SRS determined according to the classification of DCI and the value of the transmission request bit, in an A-SRS transmittable subframe which is set beforehand. Here, in terminal 300 not having a closed loop TPC set with DCI format 3/3A, transmission power of both SRSs is given according to Equation 1. On the other hand, in terminal 300 having a closed loop TPC set with DCI format 3/3A, transmission power of a P-SRS is given according to Equation 1, and transmission power of an A-SRS is given according to Equation 2. Here, $h_c(i)$ included in Equation 2 is a value obtained by accumulating TPC commands for an A-SRS with DCI format 3/3A.

$$P_{SRS,c}(i) = \min\left\{ \begin{array}{l} P_{CMAX,c}(i), P_{SRS\_OFFSET,c}(m) + 10\log_{10}(M_{SRS,c}) + \\ P_{O\_PUSCH,c}(j) + \alpha_c(j) \cdot PL_c + h_c(i) \end{array} \right\} \quad \text{(Equation 2)}$$

In addition, $h_c(i)$ may be set as $h_c(i)=f_c(i)$ at time of setting a closed loop TPC for an A-SRS with DCI format 3/3A so as to have the initial value at the setting time equal to $f_c(i)$. Alternatively, $h_c(i)$ may be set as $h_c(i)=0$ at time of setting a closed loop TPC for an A-SRS with DCI format 3/3A so as to have the initial value at the setting time equal to 0. In an operation of seldom updating transmission power parameters with an RRC control signal, power control is performed depending on a closed loop TPC. In such a case, the values of $f_c(i)$ may significantly differ from 0. Therefore, $h_c(i)=f_c(i)$ can be set at the setting time to thereby avoid a sudden change in the transmission power of an A-SRS transmitted by the terminal at time of setting a closed loop TPC with DCI format 3/3A for an A-SRS. On the other hand, an operation of frequently updating transmission power parameters with an RRC control signal is not often dependent on a closed loop TPC. In this case, NO likely has a value around 0, and $h_c(i)=0$ can be set at the setting time to prevent an excessive accumulation value from remaining.

Terminal 300 receives various kinds of DCI included in a PDSCH transmitted from a transmitting node for the base station and detects a TPC command corresponding to each of a PUSCH, a PUCCH, and an A-SRS. Then, terminal 300 performs a closed loop TPC corresponding to each of a PUSCH, a PUCCH, and an A-SRS on the basis of the TPC command.

Step (4): each base station (macro node 100 and pico node 200) receives a PUSCH, a PUCCH, and an SRS transmitted by terminal 300. An SRS is used for calculation of CSI, and a PUSCH and a PUCCH are decoded and are determined as data and control information. Macro node 100 determines a transmission/reception participating node on the basis of the CSI measurement result obtained by each node receiving an SRS. Macro node 100 determines scheduling of a PDSCH and an adaptive control on the basis of the CSI measurement result in a transmission participating node. Macro node 100 determines scheduling of a subsequent PUSCH and adaptive control on the basis of the CSI measurement result and the PUSCH reception quality in a reception participating node. Since a P-SRS is received periodically, the receiving node is monitored continuously. On the other hand, an A-SRS is transmitted only when a transmission request is issued.

Advantageous Effects

Figure 7:
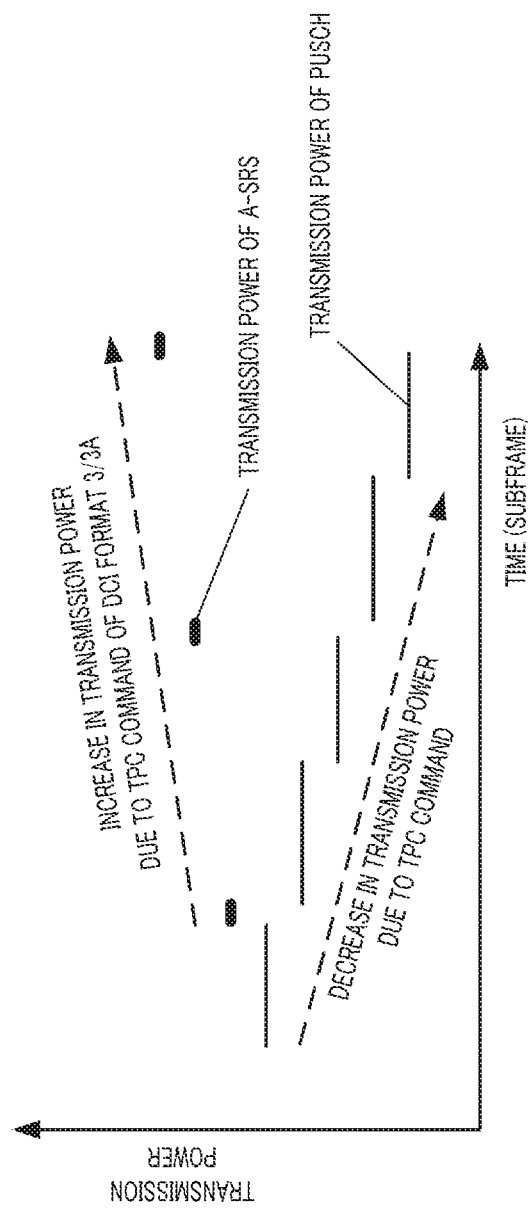
FIG. 7 illustrates the result of a transmission power control according to Embodiment 1 of the present disclosure.

As described above, in the present embodiment, terminal 300 can perform a closed loop TPC for an A-SRS independently of a PUSCH on the basis of a TPC command included in DCI transmitted from a transmitting node for the base station. FIG. 7 illustrates an example of a change in transmission power control on a PUSCH and an A-SRS in the case of using the present embodiment. In this way, even if a variation in a propagation path caused by movement of terminal 300 or a variation in a surrounding environmental occurs, an A-SRS can be controlled so as to satisfy desired reception power in an A-SRS receiving node. Therefore, when an A-SRS is used for determination of a transmission/reception participating node, CSI measurement (used for PDSCH scheduling) in a transmitting node, or the like, appropriate transmission power of an A-SRS can be maintained.

According to the present embodiment, transmission power control on an A-SRS is performed using DCI format 3/3A. DCI format 3/3A can contain many TPC commands. Therefore, the same TPC-SRS-RNTI and TPC command indices different between terminals 300 are indicated to multiple terminals 300 similarly performing the transmission power control on an A-SRS with DCI format 3/3A. Thereby, TPC commands for a plurality of terminals can be simultaneously sent with one DCI format 3/3A to therefore minimize an increase in the overhead.

[Variation 1]

Embodiment 1 has been explained using the case where a closed loop TPC for an A-SRS is performed with DCI format 3/3A. However, a closed loop TPC with DCI format 3/3A may be performed for only a specific A-SRS according to instructions from macro node 100. A specific A-SRS is any one of five kinds of A-SRSs having parameter sets which are set independently according to the classification of DCI and the value of a transmission request bit as described above.

Among DCIs including a transmission request bit, DCI format 0/4 is a DCI for indicating uplink data allocation information, and DCI format 1A/2B/2C is a DCI for indicating downlink data allocation. Since the traffic of packet data often has burstiness, assignment of a PDSCH and a PUSCH likely to concentrate temporally. In other words, transmission/reception of DCI format 0/4 and a PUSCH or transmission/reception of DCI format 1A/2B/2C and a PDSCH/PUCCH is likely to be performed continuously. Therefore, an A-SRS transmitted according to a transmission request included in DCI format 0/4 may be linked with a closed loop TPC for a PUSCH, and a closed loop TPC according to a TPC command for an A-SRS of DCI format 3/3A may be performed for an A-SRS transmitted according to a transmission request included in DCI format 1A/2B/2C. Thereby, when PUSCHs concentrate, transmission power is controlled with a closed loop TPC for a PUSCH, and an A-SRS can be transmitted and received with power suitable for reception in a receiving node for PUSCH. Thereby, scheduling of a PUSCH and adaptive control can be performed with high accuracy on the basis of the transmission/reception result of an A-SRS. On the other hand, when PDSCHs concentrate, transmission power is controlled with a closed loop TPC of DCI format 3/3A, and an A-SRS can be transmitted and received with power suitable for reception in a receiving node other than a PUSCH receiving node. Thereby, selection of a subsequent transmitting/receiving node, scheduling of a PDSCH, and adaptive control can be performed with high accuracy on the basis of the transmission/reception result of an A-SRS.

It is represented that one of five A-SRSs is set into a closed loop TPC with DCI format 3/3A, the other A-SRSs are set into a closed loop TPC linked with a PUSCH, this enables two kinds of closed loop TPCs with only an A-SRS, and various operations of an SRS is enabled with an A-SRS alone without using a P-SRS. Since an A-SRS is not transmitted periodically but is transmitted on the basis of only a transmission request, this is more advantageous than a P-SRS from a viewpoint of power consumption reduction for a terminal and the influence of interference. In this way, necessary operations for an SRS in HetNet CoMP can be performed with only an A-SRS.

[Variation 2]

Although DCI format 3/3A may be transmitted using all downlink subframes, DCI format 3/3A including a TPC command for an A-SRS may be transmitted only through a subframe or a PRB with specific time and time interval. Accordingly, since there is no need to attempt to decode DCI format 3/3A in all subframes, terminal 300 can reduce a processing load. Since DCI format 3/3A of an A-SRS may be transmitted only through a subframe with specific time or time interval, base station nodes 100 and 200 can reduce an overhead caused by TPC command transmission.

When DCI format 3/3A including the TPC command for an A-SRS is transmitted and received only through a subframe or a PRB with specific time and time interval, the transmitting opportunity of a TPC command of DCI format 3/3A decreases. However, an A-SRS for performing a closed loop TPC with DCI format 3/3A is likely to be an SRS received in a more distant node than a receiving node for a PUSCH and having a purpose of being used for selection of a transmitting/receiving node. The SRS used for selection of a transmitting/receiving node is not required to have high accuracy and a short cycle for measurement of CSI in comparison with an SRS used for scheduling of a PUSCH. Therefore, even if the transmission subframe or PRB of DCI format 3/3A is restricted as described above to reduce the transmitting opportunity of DCI format 3/3A, the accuracy of estimating an A-SRS does not deteriorate.

[Variation 3]

Furthermore, for the CRC of DCI format 3/3A for transmitting the TPC command for an A-SRS, an existing ID, i.e., TPC-PUSCH-RNTI or TPC-PUCCH-RNTI may be reused instead of scrambling with TPC-SRS-RNTI. TPC-PUSCH- RNTI and TPC-PUCCH-RNTI are RNTI for using DCI format 3/3A for a PUSCH and a PUCCH (for example, see NPL 3).

When acquiring no indication of RNTI, terminal 300 cannot decode DCI format 3/3A. In other words, when one or more terminals 300 using DCI format 3/3A for each of a PUSCH, a PUCCH, and an A-SRS exist in the cell, at least three DCI formats 3/3A have to be transmitted.

Therefore, the number of DCI formats 3/3A transmitted per subframe can be reduced by performing the following processing. First, TPC-PUSCH-RNTI or TPC-PUCCH-RNTI and a TPC command index are indicated to terminal 300 performing a closed loop TPC for an A-SRS with DCI format 3/3A. Further, control information for indicating a TPC command, which is included in DCI format 3/3A and addressed to the own terminal, to be applied to an A-SRS is indicated to corresponding terminal 300.

Accordingly, terminal 300 performing a closed loop TPC for an A-SRS using DCI format 3/3A can perform a closed loop TPC using DCI format 3/3A having CRC scrambled with TPC-PUSCH-RNTI or TPC-PUCCH-RNTI. Therefore, since a TPC command for an A-SRS can be included in DCI format 3/3A including a TPC command for a PUSCH or a PUCCH, the number of DCI formats 3/3A needed for the same subframe can be decreased to reduce the overhead. In contrast to TPC-SRS-RNTI having 16 bits, control information indicating a TPC command, which is included in DCI format 3/3A and addressed to the own terminal, to be applied to an A-SRS can be implemented by at least 1 bit. This can also reduce the overhead for an RRC control signal.

[Variation 4]

As described above, terminal 300 performing a closed loop TPC for an A-SRS using DCI format 3/3A uses DCI format 3/3A including a TPC command and DCI format 0/1A/2B/2C/4 including a transmission request, as a control signal about an A-SRS. In Embodiment 1, whether a TPC command for an A-SRS addressed to the own terminal is included in DCI format 3/3A may be combined with whether a transmission request for an A-SRS is issued with DCI format 0/1A/2B/2C/4 in the same subframe. This combination may be used to switch between $f_c(i)$ and $h_c(i)$ as a TPC command accumulation value used for calculation of transmission power.

The base station does not perform transmission of only the TPC command for an A-SRS with DCI format 3/3A without DCI format 0/4/1A/2B/2C in the same subframe to corresponding terminal 300. When transmitting a TPC command for an A-SRS with DCI format 3/3A, the base station also transmits any of the DCI simultaneously at all times.

When not detecting a transmission request for an A-SRS with any DCI but detecting only a TPC command for an A-SRS in DCI format 3/3A in the same subframe, terminal 300 does not accumulate but discards the corresponding TPC command. Only when detecting DCI format 0/4/1A/2B/2C addressed to the own terminal and the TPC command for an A-SRS with DCI format 3/3A in the same subframe, terminal 300 accumulates the corresponding TPC command into $h_c(i)$.

This can reduce a possibility that recognition of the value of $h_c(i)$ is different between the base station and terminal 300. If the TPC command to an A-SRS with DCI format 3/3A can be transmitted independently, the base station cannot know whether a TPC command transmitted by the base station is correctly detected by the terminal 300. The terminal also does not know whether the TPC command is correctly detected and accumulated. Therefore, if the base station performs a transmission request for an A-SRS, the A-SRS may be transmitted with significantly different transmission power from the assumption of the base station. This raises a concern that interference with another cell increases. On the other hand, according to this method, when transmitting a TPC command for an A-SRS with DCI format 3/3A to terminal 300, the base station also transmits DCI format 0/4/1A/2B/2C simultaneously at all times. Additionally, only when detecting both a TPC command for an A-SRS with DCI format 3/3A and any of the DCI simultaneously, terminal 300 accumulates the corresponding TPC command into $h_c(i)$. Therefore, when the TPC command is detected and accumulated into $h_c(i)$, terminal 300 always transmits a PUSCH involving control information transmitted with DCI format 0/4/1A/2B/2C or a PUCCH corresponding to a PDSCH. According to whether a PUSCH or a PUCCH is transmitted from corresponding terminal 300, the base station can know whether the TPC command is accumulated into $h_c(i)$.

Even in a case where a predetermined different subframe timing is set for a TPC command for an A-SRS with DCI format 3/3A and the transmission request for an A-SRS with DCI format 0/1A/2B/2C/4 instead of the same subframe timing as described above, the equivalent advantageous effects can be obtained.

[Variation 5]

In addition to the above explanation, when detecting the transmission request for an A-SRS with any DCI in the same subframe or a predetermined subframe timing difference and not detecting the TPC command for an A-SRS in DCI format 3/3A, terminal 300 may transmit an A-SRS with transmission power calculated using Equation 1. That is, terminal 300 calculates transmission power using accumulation value NO.

This enables effective utilization of a radio resource for an A-SRS allocated to corresponding terminal 300. Equation 1 represents transmission power calculated for the purpose of reception in a PUSCH receiving node, and Equation 2 represents transmission power calculated so as to enabling reception even in another node. Therefore, the value of Equation 1 has a high possibility of being smaller than that of Equation 2. That is, an A-SRS transmitted according to Equation 1 causes smaller interference with another cell than the case of using Equation 2.

When making a transmission request for an A-SRS to terminal 300, the base station allocates a radio resource for transmitting an A-SRS to corresponding terminal 300. Therefore, even when not detecting a TPC command with DCI format 3/3A, terminal 300 can transmit an A-SRS with transmission power according to Equation 1 to thereby assign the allocated radio resource to transmission of an A-SRS. At this time, terminal 300 can also use Equation 1 for calculation of transmission power to reduce an increase in interference with another cell.

Embodiment 2

Embodiment 2 will be explained in the case where a closed loop TPC for an A-SRS is performed by a TPC command included in DCI format 1/1A/1B/1D/2/2A/213/2C. Here, a TPC command included in DCI format 1/1A/1B/1D/2/213/2C refers to a TPC command which is conventionally applied to a PUCCH and which is accumulated into $g(i)$. It is assumed that terminal 300 is beforehand indicated to perform a closed loop TPC for an A-SRS with a TPC command included in DCI format 1/1A/1B/1D/2/2A/2B/2C, with RRC control information or the like from the base station. If receiving the above indications, terminal 300 replaces NO in the transmission power equation for an A-SRS with g(i).

A configuration of a network system according to Embodiment 2 is the same as that of Embodiment 1. In Embodiment 2, the main configurations of macro node 100, pico node 200, and terminal 300 are also the same as those of Embodiment 1. In Embodiment 2, the function of control section 302 of terminal 300 is different from that of Embodiment 1.

[Additional Function of Terminal]

Control section 302 of terminal 300 performs a closed loop TPC for an A-SRS using a TPC command for a PUCCH. That is, control section 302 adjusts the transmission power of an A-SRS on the basis of a TPC command included in received DCI format 1/1A/1B/1D/2/2B/2C. Therefore, the transmission power of an A-SRS is given by Equation 3. In Equation 3, g (i) is the accumulation value of TPC commands included in the transmission power equation for a PUCCH.

$$P_{SRS,c}(i) = \min\left\{ \begin{array}{c} P_{CMAX,c}(i), P_{SRS\_OFFSET,c}(m) + 10\log_{10}(M_{SRS,c}) + \\ P_{O\_PUSCH,c}(j) + \alpha_c(j) \cdot PL_c + g(i) \end{array} \right\}$$ (Equation 3)

Advantageous Effects

The present embodiment can perform a closed loop TPC for an A-SRS with a TPC command for a PUCCH. A PUCCH is a control signal, does not have the function for a retransmission control, and therefore needs to be surely received with high quality in comparison with a PUSCH. Therefore, a PUCCH is likely to be received by more receiving nodes in comparison with a PUSCH to thereby perform a closed loop TPC so as to acquire a high receiving diversity effect. Moreover, a PUCCH includes feedback information on a downlink retransmission control or a transmission adaptive control, and is therefore likely to undergo a closed loop TPC so as to be received also by a transmitting node for a PDSCH. Furthermore, in consideration of performing a retransmission control or a transmission adaptive control in control section 104 in the macro node, a PUCCH is also likely to undergo a closed loop TPC so as to be able to be received by macro node 100 regardless of the location of terminal 300.

In order to receive PUCCHs in many nodes, PUCCHs need to be transmitted with larger power than that of PUSCHs. A transmitting node for a PDSCH is often as distant as or more distant than a receiving node for a PUSCH, and a PUCCH needs to be transmitted with higher power than that of a PUSCH in order to receive a PUCCH in a transmitting node for a PDSCH. Also when macro node 100 transmits a PUCCH, the PUCCH has to be transmitted with high power in comparison with a PUSCH received by a nearby node. As seen from the above, it can be said that wider coverage needs to be provided for a PUCCH than that for a PUSCH. Therefore, a closed loop TPC for an A-SRS can be performed with a TPC command for a PUCCH to attain advantageous effects equivalent to Embodiment 1. Moreover, at this time, since it is unnecessary to use a new TPC command, signaling necessary for a closed loop TPC for an A-SRS does not need to be added.

[Variation 1]

Embodiment 2 has been explained in the case where a closed loop TPC for an A-SRS is performed with a TPC command included in DCI format 1/1A/1B/1D/2/2A/2B/2C. However, a closed loop TPC for only a specific A-SRS may be performed with a TPC command included in DCI format 1/1A/1B/1D/2/2A/2B/2C. A specific A-SRS is any one of five kinds of A-SRSs having parameter sets which are set independently according to the classification of DCI and the value of a transmission request bit as described above.

Thereby, a closed loop TPC for some of A-SRSs is linked with a PUSCH, a closed loop TPC for some of A-SRSs is linked with a PUCCH, and this can form different coverage according to the classification of an A-SRS. Therefore, without using a P-SRS, various operations of an SRS can be achieved with only an A-SRS. Determining which of A-SRSs is targeted on applying a TPC command included in DCI format 1/1A/1B/1D/2/2A/2B/2C, according to the classification of DCI and the value of a transmission request bit, may be regulated beforehand, and may be indicated with RRC control information or the like by the base station.

[Variation 2]

Embodiment 2 has been explained using the case where $f_c(i)$ in the transmission power equation for an A-SRS is replaced with g(i) in the case of setting of performing a closed loop TPC for an A-SRS with a TPC command included in DCI format 1/1A/1B/1D/2/2A/2B/2C from the base station. However, while $f_c(i)$ is held, an accumulated TPC command may be set as a TPC command included in DCI format 1/1A/1B/1D/2/2A/2B/2C. That is, a TPC command accumulation value is equal to $f_c(i)$ when the above setting is performed, and a TPC command as a subsequent accumulation object may be set as a TPC command included in DCI format 1/1A/1B/1D/2/2A/2B/2C.

This can avoid, in the case of switching a TPC command performing a closed loop TPC for an A-SRS, a possibility of replacing $f_c(i)$ with g(i), significantly varying transmission power between before and after the switching, and transmitting an A-SRS with excessive power to increase interference with another cell, or can avoid incapability of reception with necessary quality in a target node due to insufficiently low power.

The embodiments of the present disclosure have been described thus far.

In the embodiments described above, the present disclosure is configured with hardware by way of example, but the disclosure may also be provided by software in concert with hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

A radio communication terminal apparatus according to the embodiments described above includes: a receiving section that receives a control signal including a transmission power control command (TPC command) to be applied to an aperiodic sounding reference signal (A-SRS), through a physical downlink control channel (PDCCH); a control section that updates a transmission power value of the A-SRS using the TPC command; and a transmitting section that transmits the A-SRS using the updated transmission power value in accordance with a transmission request included in a control signal indicating assignment of a physical downlink data channel (PDSCH) or assignment of a physical uplink data channel (PUSCH).

In the radio communication terminal apparatus according to the embodiments described above, the A-SRS is an A-SRS that is transmitted when a combination of a classification of the control signal including the transmission request and a state of a transmission-request bit is a specific combination.

In the radio communication terminal apparatus according to the embodiments described above: the TPC command is a TPC command included in a control signal other than the control signal indicating assignment of a PUSCH to the radio communication terminal apparatus; the control signal including the TPC command includes one or a plurality of TPC commands targeting the radio communication terminal apparatus or a plurality of radio communication terminal apparatuses; and the control section detects a TPC command targeting an A-SRS for the radio communication terminal apparatus of the control section from the control signal and updates the transmission power value of the A-SRS using the TPC command.

In the radio communication terminal apparatus according to the embodiments described above: the control signal including the TPC command is a control signal including one or a plurality of TPC commands for one of a PUSCH and a physical uplink control channel (PUCCH) for the radio communication terminal apparatus or a plurality of radio communication terminal apparatuses; the control signal includes one or a plurality of TPC commands targeting the radio communication terminal apparatus or a plurality of radio communication terminal apparatuses; and the control section detects a TPC command targeting an A-SRS for the radio communication terminal apparatus of the control section from the control signal and updates the transmission power value of the A-SRS using the TPC command.

In the radio communication terminal apparatus according to the embodiments described above: two control signals including the control signal including the TPC command and the control signal including the transmission request are transmitted in an identical subframe or at predetermined subframe timings different from each other; and the control section updates the transmission power value of the A-SRS only when the two control signals are detected in the identical subframe or at the predetermined subframe timings different from each other.

In the radio communication terminal apparatus according to the embodiments described above, when detecting a transmission request for an A-SRS but not detecting a TPC command for the A-SRS in the identical subframe or at the predetermined subframe timings different from each other, the control section calculates the transmission power value of the A-SRS using a TPC command accumulation value for a PUSCH.

In the radio communication terminal apparatus according to the embodiments described above: the control signal including the TPC command is a control signal including a TPC command for a physical uplink control channel (PUCCH); and the control section updates the transmission power value of the A-SRS using the TPC command for the PUCCH.

A radio communication base station apparatus according to the embodiments described above includes: a transmitting section that transmits a control signal including a transmission power control command (TPC command) to be applied to an aperiodic sounding reference signal (A-SRS), through a physical downlink control channel (PDCCH); a control section that provides an instruction to update a transmission power value of the A-SRS using the TPC command; a control section that measures channel state information (CSI) using a received A-SRS; and a transmitting section that transmits a transmission request by including the transmission request in a control signal indicating assignment of a physical downlink data channel (PDSCH) or assignment of a physical uplink data channel (PUSCH).

A radio communication method according to the embodiments described above includes: receiving a control signal including a transmission power control command (TPC command) to be applied to an aperiodic sounding reference signal (A-SRS), through a physical downlink control channel (PDCCH); updating a transmission power value of the A-SRS using the TPC command; and transmitting the A-SRS using the updated transmission power value in accordance with a transmission request included in a control signal indicating assignment of a physical downlink data channel (PDSCH) or assignment of a physical uplink data channel (PUSCH).

The disclosure of the specification, drawings, and abstract included in Japanese Patent Application No. 2012-171086, filed on Aug. 1, 2012 is incorporated herein by reference in its entirety.

INDUSTRIAL APPLICABILITY

The present disclosure is applicable to a radio communication terminal apparatus, a radio communication base station apparatus, and a radio communication method in a mobile communication system, for example.

REFERENCE SIGNS LIST

100 Macro node
101 Receiving section
102 Measurement section
103 Inter-base station interface section
104 Control section
105 Transmitting section
106 Data determination section
200 Pico node
201 Receiving section
202 Measurement section
203 Inter-base station interface section
204 Transmitting section
300 Terminal
301 Receiving section
302 Control section
303 Transmitting section

The invention claimed is:

1. A radio communication base station apparatus, comprising:
 a transmitter, which, in operation, transmits control information including a transmission request for an aperiodic sounding reference signal (A-SRS) and including a transmission power control command (TPC command) for transmission of the A-SRS; and
 a receiver, which, in operation, receives the A-SRS at a controlled transmission power value, wherein
 the controlled transmission power value of the A-SRS is based on a first accumulation value of the TPC command updated with the transmitted TPC command, wherein
  an initial value of the first accumulation value is set to zero, in a first case in which a radio resource control (RRC) control signal more frequently updates a transmission power parameter associated with the TPC command than a defined frequency threshold, and
  the initial value of the first accumulation value is set to a PUSCH (Physical Uplink Shared Channel) TPC command accumulation value, in a second case in which the RRC control signal less frequently updates the transmission power parameter associated with the TPC command than the defined frequency threshold.

2. The radio communication base station apparatus according to claim 1, wherein the TPC command is included in a downlink control information (DCI) format 3/3A.

3. The radio communication base station apparatus according to claim 1, wherein the first accumulation value is updated with the TPC command received from two or more nodes in one cell.

4. The radio communication base station apparatus according to claim 1, wherein
 the controlled transmission power value of the A-SRS is based on either the first accumulation value or a second accumulation value, the second accumulation value is different from the first accumulation value and independent of the first accumulation value, and the second accumulation value is updated with a TPC command transmitted in a specific subframe in a specific downlink control information (DCI) format.

5. The radio communication base station apparatus according to claim 1, wherein
 the control information including the TPC command is different from control information indicative of PUSCH allocation, and includes one or a plurality of TPC commands targeted at one or a plurality of radio communication terminal apparatuses.

6. The radio communication base station apparatus according to claim 1, wherein
 the receiver, in operation, receives the A-SRS in response to a specific combination of a type of the control information and a bit value of the transmission request.

7. A radio communication method implemented in a radio communication base station apparatus, the method comprising:
 transmitting control information including a transmission request for an aperiodic sounding reference signal (A-SRS) and including a transmission power control command (TPC command) for transmission of the A-SRS; and
 receiving the A-SRS at a controlled transmission power value, wherein
 the controlled a transmission power value of the A-SRS is based on a first accumulation value of the TPC command updated with the transmitted TPC command, wherein
  an initial value of the first accumulation value is set to zero, in a first case in which a radio resource control (RRC) control signal more frequently updates a transmission power parameter associated with the TPC command than a defined frequency threshold, and
  the initial value of the first accumulation value is set to a PUSCH (Physical Uplink Shared Channel) TPC command accumulation value, in a second case in which the RRC control signal less frequently updates the transmission power parameter associated with the TPC command than the defined frequency threshold.

8. The radio communication method according to claim 7, wherein the TPC command is included in a downlink control information (DCI) format 3/3A.

9. The radio communication method according to claim 7, wherein the first accumulation value is updated with the TPC command received from two or more nodes in one cell.

10. The radio communication method according to claim 7, wherein
 the controlled the transmission power value of the A-SRS is based on either the first accumulation value or a second accumulation value, the second accumulation value is different from the first accumulation value and independent of the first accumulation value, and the second accumulation value is updated with a TPC command transmitted in a specific subframe in a specific downlink control information (DCI) format.

11. The radio communication method according to claim 7, wherein
 the control information including the TPC command is different from control information indicative of PUSCH allocation, and includes one or a plurality of TPC commands targeted at one or a plurality of radio communication terminal apparatuses.

12. The radio communication method according to claim 7, wherein
 the A-SRS is received in response to a specific combination of a type of the control information and a bit value of the transmission request.

* * * * *